United States Patent Office 3,324,947
Patented June 13, 1967

3,324,947
CONSOLIDATION OF UNCONSOLIDATED SANDS
Ralph E. Gilchrist, Bartlesville, Okla., assignor to Phillips Petroleum Company, a corporation of Delaware
No Drawing. Filed Oct. 22, 1964, Ser. No. 405,823
10 Claims. (Cl. 166—32)

This invention relates to a process for consolidating an unconsolidated sand around a well or borehole therein.

Many oil wells have a tendency to produce considerable quantities of sand if the oil-bearing zone is located in unconsolidated formations. Obviously, this sand is undesirable for many reasons. Various methods have been proposed to cement these particles together in order to suppress this sand-making tendency. Usually this treatment also results in reduced permeability in the immediate vicinity of the well, thus also restricting the oil recovery. Such sandy formations are encountered in a number of oil fields in the United States and in foreign oil fields.

This invention is concerned with a process for consolidating an unconsolidated sand while maintaining good permeability in the consolidated area.

Accordingly, an object of the invention is to provide a process for consolidating an unconsolidated sand without unduly reducing the permeability thereof. Another object is to provide a process for consolidating a sand containing an asphaltic crude oil. Other objects of the invention will become apparent to one skilled in the art upon consideration of the accompanying disclosure.

A broad aspect of the invention as applied to an unconsolidated sand containing an asphaltic crude oil providing precipitable asphaltenes comprises injecting a solution of $CO_2$ in a light hydrocarbon into the sand around a well therein under substantial pressure so that the light hydrocarbon contacts the oil and precipitates asphaltenes on the sand, and after a substantial and effective amount of the asphaltenes have been precipitated, rapidly reducing the pressure on the solution so that $CO_2$ is rapidly released and flows into the well. This procedure deposits asphaltenes in the form of a tacky glue-like agglomeration which coats the loose sand particles and makes them stick together. The rapid or sudden release of pressure on the solution releases $CO_2$ as a gas within the stratum causing a rapid movement of $CO_2$ into the well so as to open up pores or passageways thru the coated sand particles and avoid unduly reducing the permeability. Without the movement of $CO_2$ thru the sand in which the deposition of the asphaltenes has taken place, the sand might be completely plugged or at least greatly reduced in permeability.

A preferred embodiment of the invention comprises forming a solution of $CO_2$ in propane under sufficient pressure to maintain the propane in liquid form and incorporate therein a gaseous volume of $CO_2$ at least 50 percent of the total gaseous volume upon vaporization of the solution, and injecting the resulting solution under substantial pressure, such as a pressure in the range of 200–2000 p.s.i.g., into the sand surrounding the well into contact with the oil containing the precipitable asphaltenes. While propane is the preferred precipitant, other light hydrocarbons ranging from methane to hexane are operable with sufficient pressure to maintain the hydrocarbon in liquid phase and sufficient $CO_2$ therein to open up the sand to fluid flow after the precipitation step of the process. Sufficient solution is injected into the stratum to penetrate and permeate an annulus around the well extending radially at least 3 feet and, preferably, 6 to 20 feet from the well. After this contact, under pressure, has been maintained for a sufficient time for the propane to complete its action, the pressure is suddenly or rapidly released and the solubility of the $CO_2$ in the hydrocarbon is suddenly reduced with intense effervescence within the permeated annulus. This action opens up pores and passageways thru the asphaltic cemented sand, in effect microfracturing it, to provide permeability of the consolidated annulus to further oil production without production of sand.

In the event an unconsolidated sand contains a crude oil which is devoid of or sufficiently low in asphaltenes to render the process inoperable, a heavy asphaltic crude oil can be injected into a sizable annulus surrounding a well penetrating the same as a first step in the process which is then followed by injection of the solution of $CO_2$ under high pressure and rapid release of pressure following a waiting period so as to open up the consolidated sand. The time necessary for the propane or other light hydrocarbon to precipitate the asphalt and to "set" the sand should be carefully determined by testing samples of the sand formation containing the crude therein or containing the crude to be injected prior to the injection of the $CO_2$ solution. Just enough time to consolidate the formation is allowed for the contact of propane and the asphaltic crude as determined by laboratory tests.

The light hydrocarbon in which the $CO_2$ is dissolved need not be a pure hydrocarbon but may be a mixture of hydrocarbons. Natural gas is an illustration of one hydrocarbon mixture which is operable. A mixture of hydrocarbons containing sufficient $C_2$ to $C_6$ hydrocarbons may also be utilized. Gasoline which contains substantial concentrations of $C_5$ and $C_6$ hydrocarbons as well as smaller concentrations of lighter hydrocarbons may also be utilized.

While it is desirable to inject most of the $CO_2$ in solution form, it is not absolutely essential to inject all of the $CO_2$ in this form as $CO_2$ will dissolve in crude oil under substantial pressure. In this case release of pressure on the injected solution not only releases $CO_2$ from the solution but also from the crude oil and this increases the volume of $CO_2$ useful in opening up the consolidated sand.

While sufficient pressure is required on the $CO_2$ solution to maintain the major portion of the hydrocarbon in liquid form, it is to be understood that the pressure applied to the solution during injection must substantially exceed the existing pressure in the stratum or sand to be consolidated. If this pressure is 500 p.s.i.g., it is of course necessary to apply a higher pressure on the injected solution in order to force the same into the sand.

Certain modifications of the invention will become apparent to those skilled in the art and the illustrative details disclosed are not to be construed as imposing unnecessary limitations on the invention.

I claim:
1. A process for consolidating an unconsolidated sandy asphaltic crude oil-bearing stratum around a well penetrating same which comprises the steps of:
   (a) injecting a liquid solution of $CO_2$ in a $C_2$ to $C_6$ hydrocarbon capable of precipitating asphaltenes into said stratum while maintaining said solution under substantial pressure so as to prevent any appreciable release of $CO_2$ and precipitate asphaltenes on the sand particles; and
   (b) after substantial precipitation has occurred, suddenly releasing pressure on the injected solution of step (a) so as to free $CO_2$ from solution and allow same to return to the well, thereby opening up pores and passageways thru the stratum while leaving said asphalt on the sand particles to consolidate same.
2. The process of claim 1 wherein the hydrocarbon of step (a) is normally gaseous and the concentration of $CO_2$ in said hydrocarbon is at least 50 percent of the total gas volume.

3. The process of claim 1 wherein the solution in step (a) is injected into the stratum at least 3 feet before release of pressure in step (b).

4. The process of claim 1 wherein the solution in step (a) is injected into the stratum a distance in the range of about 6 to about 20 feet before release of pressure in step (b).

5. A process for consolidating an unconsolidated sandy asphaltic crude oil-bearing stratum around a well penetrating same which comprises the steps of:
   (a) forming a liquid solution of $CO_2$ in a light hydrocarbon capable of precipitating asphaltenes under substantial pressure to maintain said $CO_2$ in solution;
   (b) injecting resulting solution under pressure into said stratum thru said well to substantially saturate an adjacent annulus of the stratum at least 3 feet deep radially from the well;
   (c) maintaining pressure on the solution in said annulus so as to precipitate a substantial and effective amount of asphaltenes onto the sand particles in said annulus to consolidate same; and
   (d) thereafter, releasing the pressure on the solution in said annulus so as to allow escape of gaseous $CO_2$ from said annulus into said well.

6. The process of claim 5 wherein the concentration of $CO_2$ in the hydrocarbon in step (a) is at least 50 percent of the total gaseous volume formed by vaporizing said solution.

7. The process of claim 6 wherein said hydrocarbon comprises principally propane.

8. The process of claim 6 wherein said hydrocarbon is natural gas.

9. A process for consolidating an unconsolidated sand which is substantially free of oil containing precipitable asphaltenes, which comprises the steps of:
   (a) injecting a heavy asphaltic oil containing precipitable asphaltenes thru a well penetrating said sand and into an annulus of sand around said well;
   (b) thereafter, injecting thru said well into the annulus containing the injected oil of step (a), a solution of $CO_2$ in a light hydrocarbon capable of precipitating asphaltenes under substantial pressure so as to contact the injected oil, causing said hydrocarbon to precipitate asphaltenes therefrom onto said sand; and
   (c) rapidly releasing pressure on the solution in said annulus so as to rapidly release $CO_2$ within said annulus and cause same to flow into said well and open the pores of said annulus to flow of fluids therethru.

10. The process of claim 9 wherein the hydrocarbon in said solution comprises principally propane.

References Cited

UNITED STATES PATENTS

| | | | |
|---|---|---|---|
| 2,223,789 | 12/1940 | Limburg | 166—32 |
| 2,708,481 | 5/1955 | Allen | 166—9 |
| 2,713,906 | 7/1955 | Allen | 166—32 |
| 2,876,840 | 3/1959 | Berry | 166—32 X |
| 2,896,716 | 7/1959 | Spurlock | 166—32 |
| 3,084,744 | 4/1963 | Dew et al. | 166—32 X |

CHARLES E. O'CONNELL, *Primary Examiner.*

JACOB L. NACKENOFF, *Examiner.*

S. J. NOVOSAD, *Assistant Examiner.*